(12) United States Patent
Thibodeaux et al.

(10) Patent No.: US 8,328,566 B1
(45) Date of Patent: Dec. 11, 2012

(54) TERMINAL CONNECTION FOR SEALED COMPRESSOR

(75) Inventors: Lamar Wilson Thibodeaux, Arkadelphia, AR (US); Thierry Poiret, Trevoux (FR); Sui Yong, Tianjin (CN); Zhao Yanbo, Tianjin (CN); Yao Wenhu, Tianjin (CN)

(73) Assignee: Danfoss Scroll Technologies, LLC, Arkadelphia, AR (US)

( * ) Notice: Subject to any disclaimer, the term of this patent is extended or adjusted under 35 U.S.C. 154(b) by 0 days.

(21) Appl. No.: 13/178,568

(22) Filed: Jul. 8, 2011

(51) Int. Cl.
*H01R 13/44* (2006.01)

(52) U.S. Cl. ........ 439/149; 439/135; 439/521; 439/692; 439/718

(58) Field of Classification Search .................. 439/135, 439/149, 278, 281, 282, 367, 521, 692, 718, 439/912, 926
See application file for complete search history.

(56) References Cited

U.S. PATENT DOCUMENTS

| | | | | |
|---|---|---|---|---|
| 5,417,592 A * | 5/1995 | West | ............................. | 439/624 |
| 5,584,716 A * | 12/1996 | Bergman | ...................... | 439/282 |
| 5,664,959 A * | 9/1997 | Duell et al. | ...................... | 439/278 |
| 6,290,528 B1 * | 9/2001 | Moore et al. | ................... | 439/367 |
| 6,372,993 B1 * | 4/2002 | Eckels et al. | ........... | 174/152 GM |
| 6,705,892 B2 * | 3/2004 | Kim | ................................ | 439/542 |
| 6,916,210 B2 * | 7/2005 | Moore et al. | ................... | 439/685 |
| 7,163,411 B2 * | 1/2007 | Kawashima et al. | .......... | 439/135 |
| 7,335,042 B2 * | 2/2008 | Chirumbolo | ................... | 439/282 |
| 7,993,158 B2 * | 8/2011 | Kang | .............................. | 439/519 |
| 8,047,862 B2 * | 11/2011 | Lilie et al. | ...................... | 439/271 |
| 2001/0001638 A1 * | 5/2001 | Hirooka | ...................... | 417/410.1 |
| 2011/0092089 A1 * | 4/2011 | Lilie et al. | ...................... | 439/271 |

\* cited by examiner

*Primary Examiner* — James Harvey
(74) *Attorney, Agent, or Firm* — Carlson, Gaskey & Olds, PC

(57) ABSTRACT

A sealed compressor has an electric motor and a compressor pump unit to be driven by the electric motor. Power is supplied to the electric motor by a terminal plug received within a housing, which communicates electricity through an electric connection and into a shell housing the compressor. A cable is connected to the terminal plug at a location at least partially outwardly of the housing. The cable includes a ground wire and ground connector, which is connected to a ground pin associated with one of the housing and the shell. The cable has a head connected to connections associated with the housing. A shield extends over a ground connection between the cable and the ground pin. A cable and cable head as mentioned above are also disclosed and claimed.

8 Claims, 2 Drawing Sheets

TERMINAL CONNECTION FOR SEALED COMPRESSOR

BACKGROUND

This application relates to a cable connection for connecting an electric cable to a terminal housing on a sealed compressor shell.

Sealed compressors are known, and typically include a fluid-tight shell enclosing an electric motor and a compressor pump unit. Refrigerant is allowed to circulate within the shell, and thus the shell must be hermetically sealed. Any electrical connection into the housing must be well sealed.

It is known to provide terminal housings on an outer surface of the shell which receives a terminal plug to communicate electricity into the shell. In one standard type of connection, an electric cable extends from a source of power to the terminal plug, and is connected onto electrical connections extending outwardly through an opening in the housing. The cable is then received on these connections, and electricity can be supplied from the cable, through the connections, and into the electric motor within the shell.

The terminal housing is typically provided with a ground pin, and a ground connection is made between the cable and this ground pin to provide grounding for the connection. The ground pin may also be on the shell itself.

The location of the ground pin is often exposed to the possibility of being contacted, hit, or otherwise damaged.

SUMMARY

A sealed compressor has an electric motor and a compressor pump unit to be driven by the electric motor. Power is supplied to the electric motor by a terminal plug received within a housing, which communicates electricity through an electric connection and into a shell housing the compressor. A cable is connected to the terminal plug at a location at least partially outwardly of the housing. The cable includes a ground wire and ground connector, which is connected to a ground pin associated with one of the housing and the shell. The cable has a head connected to connections associated with the housing. A shield extends over a ground connection between the cable and the ground pin.

A cable and cable head as mentioned above are also disclosed and claimed.

These and other features of the present invention can be best understood from the following specification and drawings, of which the following is a brief description.

DETAILED DESCRIPTION

Figure 1:
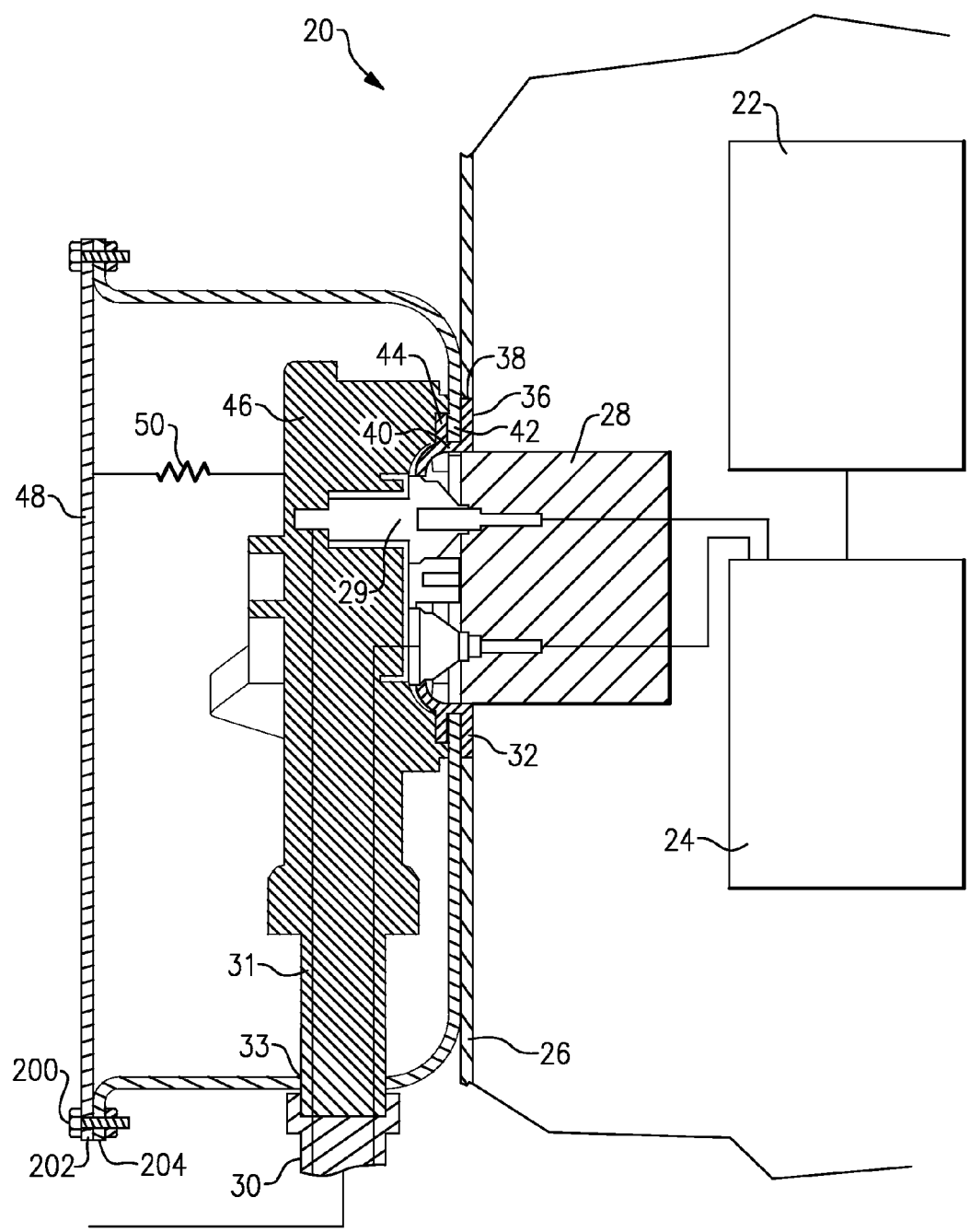
FIG. 1 schematically shows a sealed compressor and its electrical terminal connections.

FIG. 1 shows a sealed compressor 20 incorporating a compressor pump unit 22 and an electric motor 24. A shell 26 defines an interior which is sealed against fluid leakage. Refrigerant typically flows around the motor 24 within the shell 26. Electric power must be supplied to the motor 24, and an electric connector 28 is shown inward of the shell 26. A terminal connection 29 is shown extending from a terminal plug 31 which is connected within a fence or housing 42.

A cable 30 plugs into an end of the terminal connection 31 outwardly of the housing 42. A hole 33 allows the terminal plug 31 to exit the housing. A cover 46 is shown bolted at 200 to the housing at an ear 204 and holes 202 in cover 46.

A grommet 32 provides a fluid tight seal between the housing 42 and the shell 26. As shown, the grommet 32 has ears 44 sitting outwardly of an end of the housing 42, and an end 36 which seals against the shell 26.

As shown in this Figure, a spring 50 is schematically biasing the terminal plug 46 to maintain the connection between connector 28 and pin 29.

Figure 2:
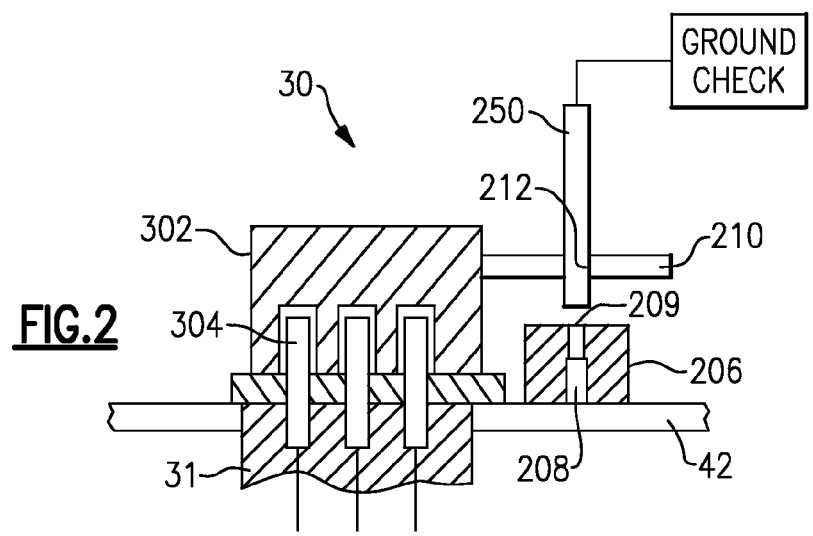
FIG. 2 shows a cable connection.

As shown in FIG. 2, the cable 30 includes a cable head 302 having electrical contacts connecting onto pins 304 extending from the connector 31 and through the housing wall 42.

The wall of the housing 42 is provided with a ground pin 208. A ground plug 206 from the cable 30 provides a ground connection when it is received on the ground pin 208.

A shield or mask 210 provides protection to the ground pin 208 and plug 206 connection. An opening 212 allows a ground check tool 250 to extend through the shield 210 to check that an adequate ground is provided. Hole 209 is provided in the plug 206.

The shield 210 provides protection to the ground connection between pin 208 and plug 206.

Figure 3:
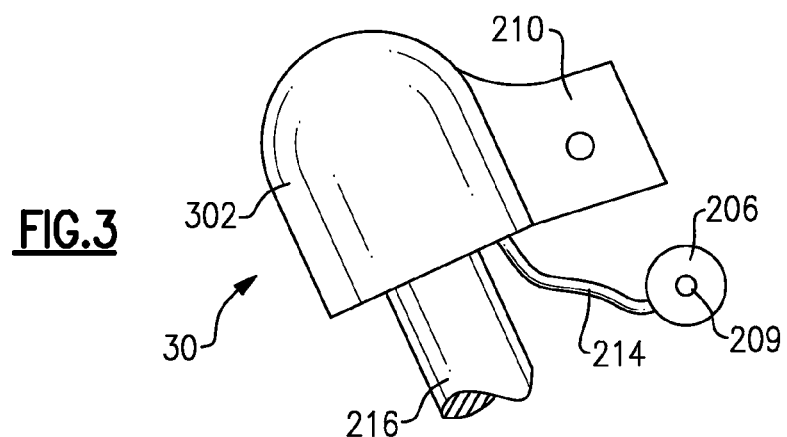
FIG. 3 shows the cable in an unassembled state.

As shown in FIG. 3, the head 302 of the cable connects to a power cable 216, the shield 210, and through a ground wire 214, to the plug 206.

Figure 4:
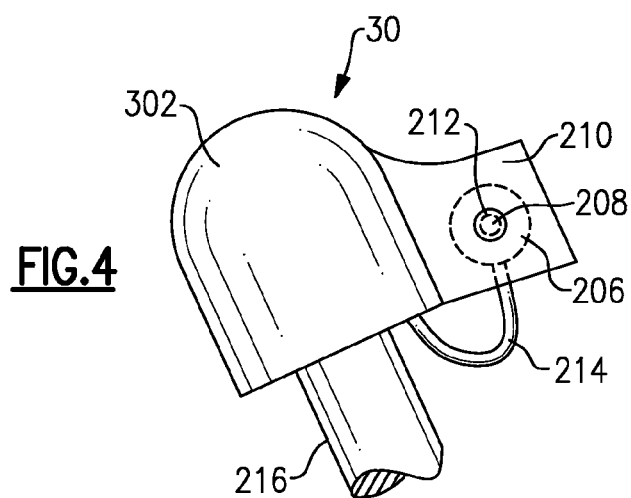
FIG. 4 shows the cable assembled to the housing.

FIG. 4 shows the connection having been made, with the ground pin 208 centered on the hole 209 in the plug 206, and in the hole 212 in shield 210.

As shown, the head 302 of the cable has the shield 210 formed on only one side, which would be the side associated with the ground connection when the cable is mounted onto a compressor.

In connecting the cable 30, initially the ground connection between ground plug 206 and pin 208 is made. Then, the connection between cable head 302, and pins 304 is made. In this manner, the ground is complete before the main power connection is made. Disconnecting occurs in a reverse manner, with the cable head 302 initially being disconnected from pins 304, and then the ground connection being removed. The structure of the ground plug being connected by a separate wire 214, and the use of the shield 210, facilitates this order of connection.

The spring 50 is shown schematically, however, details of the spring are better disclosed in co-pending U.S. patent application Ser. No. 13/178,555, filed on even date herewith, and entitled "Secure Connection Terminal for Hermetic Compressor." The sealing grommet is better disclosed in co-pending U.S. application Ser. No. 13/178,616, filed on even date herewith, and entitled "Sealing Grommet For Connection Between Terminal Housing And Interior Of Sealed Compressor."

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A sealed compressor comprising:
   an electric motor and a compressor pump unit driven by said electric motor, a power supply for supplying power to said electric motor, said power supply including a terminal plug received within a housing, and communicating electricity through an electric connection and into a shell that encloses the compressor pump unit and motor; and a cable connected to said terminal plug at a location at least partially outwardly of said housing, and said cable including a ground wire and ground plug, said ground plug being connected to a ground pin associated with one of said housing and said shell, and said cable having a head connected to connections in the terminal plug, and a shield extending over the connection between said ground plug and said ground pin, said shield extending outwardly of said head of said cable, and positioned to be spaced further from said one of said housing and said shell, then said ground plug and said ground pin, such that said shield protects the connection of said ground plug, which is received on said ground pin to complete a ground connection.

2. The compressor as set forth in claim 1, wherein said head of said cable is provide with a ground wire extending to the ground plug which is received on a ground pin.

3. The compressor as set forth in claim 2, wherein said ground pin is fixed on said housing.

4. The compressor as set forth in claim 2, wherein said shield is only located on a side of said head associated with the ground connection.

5. The compressor as set forth in claim 1, wherein said shield and said ground plug each have a hole such that a ground test tool can extend through said holes, and to contact said ground pin to ensure that an adequate ground is provided between said cable and the compressor.

6. An electric cable to be connected onto a connection on a compressor comprising:

a power cable extending to a plug head, and a ground shield extending outwardly of one side of said head, and a ground wire extending to a ground connection, with said ground connection being alignable underneath said shield;

said ground connection is a ground plug said shield and said ground plug each have a hole such that a ground test tool can extend through said holes to contact a ground pin on an associated compressor to ensure that an adequate ground is provided between said cable and the compressor.

7. A method of assembling a cable onto a compressor comprising the steps of:

attaching a ground plug which is connected by a wire to a cable head onto a ground pin associated with the compressor completing a ground connection;

connecting the cable head to terminal pins on the compressor to provide electrical power to a motor for the compressor; and said cable head also carrying a shield, with said shield protecting the ground plug and ground pin.

8. The method as set forth in claim 7, wherein said shield and said ground plug each have a hole, and a ground test tool extending through said holes to contact the ground pin to ensure that an adequate ground has been provided between said cable and the compressor.

* * * * *